United States Patent
Shiraga et al.

(10) Patent No.: US 12,462,168 B2
(45) Date of Patent: Nov. 4, 2025

(54) INFORMATION PROCESSING APPARATUS, NON-TRANSITORY COMPUTER-READABLE STORAGE MEDIUM, AND INFORMATION PROCESSING METHOD

(71) Applicant: Mitsubishi Electric Corporation, Tokyo (JP)

(72) Inventors: Takeru Shiraga, Tokyo (JP); Nobuaki Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 681 days.

(21) Appl. No.: 17/882,296

(22) Filed: Aug. 5, 2022

(65) Prior Publication Data

US 2022/0383147 A1 Dec. 1, 2022

Related U.S. Application Data

(63) Continuation of application No. PCT/JP2020/011066, filed on Mar. 13, 2020.

(51) Int. Cl.
*G06T 11/00* (2006.01)
*G06N 5/022* (2023.01)

(52) U.S. Cl.
CPC ............... *G06N 5/022* (2013.01); *G06T 11/00* (2013.01)

(58) Field of Classification Search
CPC ....................................................... G06T 11/00

(Continued)

(56) References Cited

U.S. PATENT DOCUMENTS 6,735,703 B1 * 5/2004 Kilpatrick ............. G06F 21/554
713/151
6,742,124 B1 * 5/2004 Kilpatrick ........... H04L 63/1416
726/23

(Continued)

FOREIGN PATENT DOCUMENTS

CN 107506700 A 12/2017
JP 2004-199288 A 7/2004

(Continued)

OTHER PUBLICATIONS

Indian Office Action for corresponding Application No. 202247043894, dated Nov. 24, 2022, with English translation.

(Continued)

*Primary Examiner* — Reza Nabi
(74) *Attorney, Agent, or Firm* — BIRCH, STEWART, KOLASCH & BIRCH, LLP

(57) ABSTRACT

An information processing apparatus includes: the distance-matrix calculating unit generates, from a data set including samples, a similarity matrix having columns and rows arranged in accordance with an order of the arranged samples, and stores a similarity between a sample corresponding to one of the columns and a sample corresponding to one of the rows in a field specified by the one of the columns and the one of the rows; the order adjusting unit generates an adjusted similarity matrix by referring to label information indicating a result of labeling each of the samples with labels each having classes and adjusting the order in the similarity matrix so that the samples are arranged by each of the classes in a target label designating in the labels; the visualizing unit generates an evaluation screen image indicating each field of the adjusted similarity matrix in brightness corresponding to the similarity.

11 Claims, 14 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 6,748,356 | B1* | 6/2004 | Beigi | G10L 21/028 |
| | | | | 704/250 |
| 7,124,120 | B2* | 10/2006 | Wikiel | C25D 21/12 |
| | | | | 205/775 |
| 9,843,596 | B1* | 12/2017 | Averbuch | G06F 21/554 |
| 11,483,327 | B2* | 10/2022 | Hen | H04L 63/104 |
| 2003/0014250 | A1* | 1/2003 | Beigi | G10L 17/02 |
| | | | | 704/238 |
| 2005/0183958 | A1* | 8/2005 | Wikiel | C25D 21/12 |
| | | | | 205/82 |
| 2007/0269804 | A1* | 11/2007 | Liew | G16B 40/00 |
| | | | | 702/19 |
| 2011/0255748 | A1* | 10/2011 | Komoto | G06V 40/20 |
| | | | | 382/103 |
| 2013/0178953 | A1* | 7/2013 | Wersborg | B23K 26/34 |
| | | | | 700/48 |
| 2013/0338965 | A1* | 12/2013 | Ide | G06F 18/10 |
| | | | | 702/181 |
| 2017/0286811 | A1* | 10/2017 | Shafer | G06V 10/764 |
| 2018/0053071 | A1* | 2/2018 | Chen | G06N 20/10 |
| 2018/0248900 | A1* | 8/2018 | Keshet | H04L 63/1425 |
| 2018/0336435 | A1 | 11/2018 | Takeuchi | |
| 2022/0067386 | A1* | 3/2022 | Rotman | G06F 18/217 |
| 2022/0327182 | A1* | 10/2022 | Yousef | G06F 17/18 |
| 2022/0383147 | A1* | 12/2022 | Shiraga | G06T 11/00 |
| 2023/0144809 | A1* | 5/2023 | Tajima | G06N 3/08 |
| | | | | 706/12 |
| 2023/0317206 | A1* | 10/2023 | Salipante | G16B 20/10 |
| | | | | 435/6.11 |
| 2023/0353588 | A1* | 11/2023 | Geethanath | G06F 11/3006 |
| 2023/0359696 | A1* | 11/2023 | Xin | G06F 17/16 |

FOREIGN PATENT DOCUMENTS

| | | |
|---|---|---|
| JP | 2013-257251 A | 12/2013 |
| JP | 2015-225637 A | 12/2015 |
| JP | 2018-169936 A | 11/2018 |

OTHER PUBLICATIONS

International Search Report for PCT/JP2020/011066 mailed on Sep. 24, 2020.

Written Opinion of the International Searching Authority for PCT/JP2020/011066 mailed on Sep. 24, 2020.

Ali et al., "Clustering and Classification for Time Series Data in Visual Analytics: a Survey," IEEE Access, vol. 7, Dec. 23, 2019, pp. 181314-181338.

German Office Action for German Application No. 11 2020 006 501.4, dated May 22, 2024, with an English translation.

Hadlak et al., "Supporting the Visual Analysis of Dynamic Networks by Clustering Associated Temporal Attributes," IEEE Transactions on Visualization and Computer Graphics, vol. 19, No. 12, Dec. 2013, pp. 2267-2276.

Wu et al., "Matrix Visualization," Handbook of Data Visualization, Springer, 2008, pp. 681-708.

Chinese Office Action and Search Report for Chinese Application No. 202080097931.1, dated Jul. 11, 2025, with English translation.

* cited by examiner

FIG. 3

SAMPLE NUMBER

|    | #1  | #2  | #3  | #4  | #5  | #6  | #7  | #8  |
|----|-----|-----|-----|-----|-----|-----|-----|-----|
| #1 | 0   | 1.2 | 1.3 | 0.9 | 1.1 | 1.2 | 2.5 | 1.2 |
| #2 | 1.2 | 0   | 2.5 | 2.1 | 2.3 | 2.5 | 2.1 | 1.3 |
| #3 | 1.3 | 2.5 | 0   | 1.4 | 1.4 | 1.3 | 2.3 | 0.9 |
| #4 | 0.9 | 2.1 | 1.4 | 0   | 1.2 | 1.3 | 2.5 | 1.1 |
| #5 | 1.1 | 2.3 | 1.4 | 1.2 | 0   | 1.1 | 1.2 | 1.2 |
| #6 | 1.2 | 2.5 | 1.3 | 1.3 | 1.1 | 0   | 2.5 | 0.8 |
| #7 | 2.5 | 2.1 | 2.3 | 2.5 | 1.2 | 2.5 | 0   | 1.3 |
| #8 | 1.2 | 1.3 | 0.9 | 1.1 | 1.2 | 0.8 | 1.3 | 0   |

SAMPLE NUMBER (row label)

FIG. 4

SAMPLE NUMBER

| | | NORMAL | | | | ABNORMAL | | | |
|---|---|---|---|---|---|---|---|---|---|
| | | #1 | #3 | #5 | #7 | #2 | #4 | #6 | #8 |
| NORMAL | #1 | 0 | 1.3 | 1.1 | 2.5 | 1.2 | 0.9 | 1.2 | 1.2 |
| | #3 | 1.3 | 0 | 1.4 | 2.3 | 2.5 | 1.4 | 1.3 | 0.9 |
| | #5 | 1.1 | 1.4 | 0 | 1.2 | 2.3 | 1.2 | 1.1 | 1.2 |
| | #7 | 2.5 | 2.3 | 1.2 | 0 | 2.1 | 2.5 | 2.5 | 1.3 |
| ABNORMAL | #2 | 1.2 | 2.5 | 2.3 | 2.1 | 0 | 2.1 | 2.5 | 1.3 |
| | #4 | 0.9 | 1.4 | 1.2 | 2.5 | 2.1 | 0 | 1.3 | 1.1 |
| | #6 | 1.2 | 1.3 | 1.1 | 2.5 | 2.5 | 1.3 | 0 | 0.8 |
| | #8 | 1.2 | 0.9 | 1.2 | 1.3 | 1.3 | 1.1 | 0.8 | 0 |

SAMPLE NUMBER (row label)

FIG. 5A

|  | NORMAL | ABNORMAL |
|---|---|---|
| NORMAL | ▨ |  |
| ABNORMAL |  | ▨ |

FIG. 5B

|  | 0612 | 0613 |
|---|---|---|
| 0612 | | |
| 0613 | | |

FIG. 6A

|  | NORMAL | ABNORMAL |
|---|---|---|
| NORMAL | | |
| ABNORMAL | | |

FIG. 6B

|  | 0612 | 0613 |
|---|---|---|
| 0612 | | |
| 0613 | | |

FIG. 7

|  | | NORMAL | | ABNORMAL | |
|--|--|--------|--|----------|--|
|  | | 0612 | 0613 | 0612 | 0613 |
| NORMAL | 0612 | ▨ | | ▨ | |
| | 0613 | | ▨ | | ▨ |
| ABNORMAL | 0612 | ▨ | | ▨ | |
| | 0613 | | ▨ | | ▨ |

FIG. 8

|   | 1 | 2 | ... | C |
|---|---|---|---|---|
| 1 | $D_{11}$ | $D_{12}$ | ... | $D_{1C}$ |
| 2 | $D_{21}$ | $D_{22}$ | ... | $D_{2C}$ |
| ⋮ | ⋮ | ⋮ | ⋱ | ⋮ |
| C | $D_{C1}$ | $D_{C2}$ | ... | $D_{CC}$ |

INFORMATION PROCESSING APPARATUS, NON-TRANSITORY COMPUTER-READABLE STORAGE MEDIUM, AND INFORMATION PROCESSING METHOD

CROSS-REFERENCE TO RELATED APPLICATION

This application is a continuation application of International Application No. PCT/JP2020/011066 having an international filing date of Mar. 13, 2020.

BACKGROUND OF THE INVENTION

1. Field of the Invention

The disclosure relates to an information processing apparatus, a program, and an information processing method.

2. Description of the Related Art

In recent years, a development in measuring techniques has allowed various kinds of data to be measured and utilized. For example, to diagnose the abnormality of a device, a vibration sensor or a microphone is installed in the device, and vibration or sound obtained from the device is measured. The data obtained in this way is used to diagnose the abnormality of the device.

When such measured data are used, the quality of the data may be degraded due to variation in the measurement environment or sensing. For example, in one case, the sensor may be mounted by different measurers through different methods, and as a result, the nature of the data may change. If variation in the data due to factors unrelated to the original measurement purpose becomes large, this may become an obstacle to the identification of the original target label, e.g., the identification of normal or abnormal.

Patent Literature 1 discloses a correlation analysis apparatus that divides time-series data into data pieces of predetermined time units, calculates the similarity in each time unit, and displays, at a predetermined position on a two-dimensional plane, the correlation in each predetermined time on the basis of the calculated similarities.

Patent Literature 1: Japanese Patent Application Publication No. 2015-225637

SUMMARY OF THE INVENTION

The correlation analysis apparatus described in Patent Literature 1 can display a correlation based on the similarity in each time unit. In this way, the variation in data over time becomes apparent. However, factors other than time, such as the "measurer" or the "individual apparatus," are not considered.

Accordingly, one or more aspects of the disclosure can check data variation caused by factors unrelated to the original measurement purpose.

An information processing apparatus according to a first aspect of the disclosure includes: a processor to execute a program; and a memory to store the program which, when executed by the processor, performs processes of, generating a similarity matrix from a data set including a plurality of samples, the similarity matrix having a plurality of columns horizontally arranged in accordance with an order in which the plurality of samples is arranged and a plurality of rows vertically arranged in accordance with the order, the similarity matrix storing a similarity between a sample corresponding to one of the columns and a sample corresponding to one of the rows in a field specified by the one of the columns and the one of the rows; generating an adjusted similarity matrix by referring to label information indicating a result of labeling each of the samples with a plurality of labels each having a plurality of classes and adjusting the order in the similarity matrix so that the samples are arranged by each of the classes of a target label designated in the plurality of labels; generating an evaluation screen image indicating each field of the adjusted similarity matrix with brightness corresponding to the similarity; and displaying the evaluation screen image.

An information processing apparatus according to a second aspect of the disclosure includes: a processor to execute a program; and a memory to store the program which, when executed by the processor, performs processes of, referring to label information indicating a result of labeling each of a plurality of samples included in a data set with a plurality of labels each having a plurality of classes, calculate a degree of variation of the samples caused by each of the labels; generating a variation result screen image displaying at least one label included in the plurality of labels and the degree of variation corresponding to the at least one label; and displaying the variation result screen image.

An information processing apparatus according to a third aspect of the disclosure includes: a processor to execute a program; and a memory to store the program which, when executed by the processor, performs processes of, referring to label information indicating a result of labeling each of a plurality of samples included in a data set with a plurality of labels each having a plurality of classes, calculate a degree of variation of the samples caused by each of the classes; generating a variation result screen image displaying the classes and the degree of variation corresponding to each of the classes; and displaying the variation result screen image.

A non-transitory computer-readable storage medium according to a first aspect of the disclosure causes a computer to execute processes including: generating a similarity matrix from a data set including a plurality of samples, the similarity matrix having a plurality of columns horizontally arranged in accordance with an order in which the plurality of samples is arranged and a plurality of rows vertically arranged in accordance with the order, the similarity matrix storing a similarity between a sample corresponding to one of the columns and a sample corresponding to one of the rows in a field specified by the one of the columns and the one of the rows; generating an adjusted similarity matrix by referring to label information indicating a result of labeling each of the samples with a plurality of labels each having a plurality of classes and adjusting the order in the similarity matrix so that the samples are arranged by each of the classes of a target label designated in the plurality of labels; generating an evaluation screen image indicating each field of the adjusted similarity matrix in brightness corresponding to the similarity; and displaying the evaluation screen image.

A non-transitory computer-readable storage medium according to a second aspect of the disclosure causes a computer to execute processes including: referring to label information indicating a result of labeling each of a plurality of samples included in a data set with a plurality of labels each having a plurality of classes, calculate degrees of variation of the samples caused by each of the labels; generating a variation result screen image displaying at least one label included in the plurality of labels and the degree of variation corresponding to the at least one label; and displaying the variation result screen image.

A non-transitory computer-readable storage medium according to a third aspect of the disclosure causes a computer to execute processes including: referring to label information indicating a result of labeling each of a plurality of samples included in a data set with a plurality of labels each having a plurality of classes, calculate a degree of variation of each of the samples caused by each of the classes; generating a variation result screen image displaying each of the classes and the degree of variation corresponding to each of the classes; and displaying the variation result screen image.

An information processing method according to a first aspect of the disclosure includes: generating a similarity matrix from a data set including a plurality of samples, the similarity matrix having a plurality of columns horizontally arranged in accordance with an order in which the plurality of samples is arranged and a plurality of rows vertically arranged in accordance with the order, the similarity matrix storing a similarity between a sample corresponding to one of the columns and a sample corresponding to one of the rows in a field specified by the one of the columns and the one of the rows; generating an adjusted similarity matrix by referring to label information indicating a result of labeling each of the samples with a plurality of labels each having a plurality of classes and adjusting the order in the similarity matrix so that the samples are arranged by each of the classes of a target label designated in the plurality of labels; generating an evaluation screen image indicating each field of the adjusted similarity matrix in brightness corresponding to the similarity; and displaying the evaluation screen image.

An information processing method according to a second aspect of the disclosure includes: referring to label information indicating a result of labeling each of a plurality of samples included in a data set with a plurality of labels each having a plurality of classes and calculating a degree of variation of each of the samples caused by each of the labels; generating a variation result screen image displaying at least one label included in the plurality of labels and the degree of variation corresponding to the at least one label; and displaying the variation result screen image.

An information processing method according to a third aspect of the disclosure includes: referring to label information indicating a result of labeling each of a plurality of samples included in a data set with a plurality of labels each having a plurality of classes and calculating a degree of variation of each of the samples caused by each of the classes; generating a variation result screen image displaying the classes and the degree of variation corresponding to each of the classes; and displaying the variation result screen image.

According to one or more aspects of the disclosure, data variation caused by factors unrelated to the original measurement purpose can be checked.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a schematic diagram illustrating an example of a distance matrix;

FIG. 4 is a schematic diagram illustrating a first example of an adjusted distance matrix;

FIGS. 5A and 5B are schematic diagrams respectively illustrating second and third examples of an adjusted distance matrix;

FIGS. 6A and 6B are schematic diagrams respectively illustrating fourth and fifth examples of an adjusted distance matrix;

FIG. 7 is a schematic diagram illustrating a sixth example of an adjusted distance matrix;

FIG. 8 is a schematic diagram illustrating a first example of an evaluation screen image that visualizes an adjusted distance matrix;

MODE FOR CARRYING OUT THE INVENTION

Detailed Description of the Invention

Information processing apparatus, non-transitory computer-readable storage medium, and information processing method according to embodiments of the present invention will be described below with reference to the accompanying drawings. The following embodiments are just examples and a variety of modifications are possible within the scope of the present invention.

First Embodiment

Figure 1:
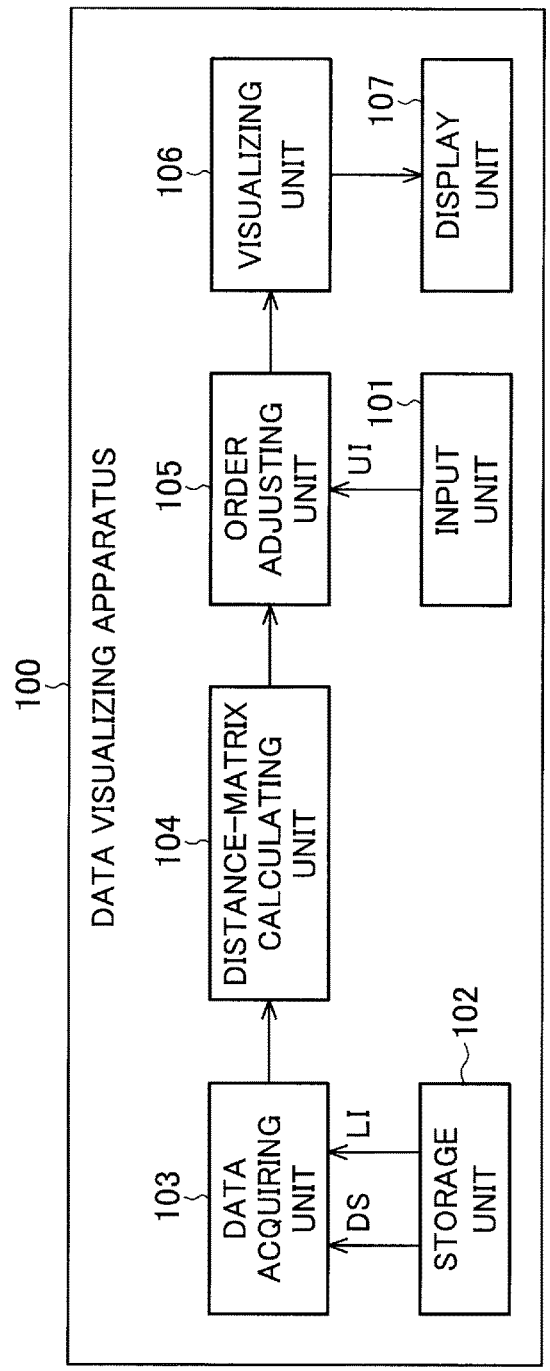
FIG. 1 is a block diagram schematically illustrating the configuration of a data visualizing apparatus according to a first embodiment.

FIG. 1 is a block diagram schematically illustrating the configuration of an information processing apparatus or a data visualizing apparatus 100 according to the first embodiment.

The data visualizing apparatus 100 includes an input unit 101, a storage unit 102, a data acquiring unit 103, a distance-matrix calculating unit 104, an order adjusting unit 105, a visualizing unit 106, and a display unit 107.

The input unit 101 receives input of instructions from a user. For example, the input unit 101 receives input designating one label as a target label out of multiple labels.

The storage unit 102 stores programs and data necessary for processing by the data visualizing apparatus 100. For example, the storage unit 102 stores data sets to be visualized and label information of the data sets.

A data set is, for example, a set of time-series data obtained through measurement. A data set is composed of a set of multiple samples.

The samples in a data set constitute a unit for calculating a distance matrix by the distance-matrix calculating unit 104. Each sample is time-series data obtained, for example, by a vibration sensor or a microphone.

The sample is one-dimensional data indicating a value measured at each time point, but is not limited to such one-dimensional data. The sample may be multidimensional data indicating multiple values at each time point.

The label information indicates an attribute associated with each sample in the data set. The label information is information indicating a result of labeling each of the samples using multiple labels. Each of the labels has multiple classes.

Described below as an example is label information associated with samples that are measured data collected for the purpose of diagnosing the abnormality of a device.

The purpose of measuring the data is to distinguish abnormality or normality on the basis of the measured data.

In such a case, each sample is provided with label information including a label indicating an inspection result. The label indicating an inspection result or an inspection result label may include two classes, a "normal class" and an "abnormal class," or three or more classes, such as a "normal class," a "first abnormal class," and a "second abnormal class," to correspond to the types of abnormality. Here, classes indicate certain states included in a same label. For example, different classes indicate different states in the same label.

In some cases, the measured data may contain labels that are expected to be unrelated to the label corresponding to the purpose of the measured data (which in this case is the diagnosis of normal or abnormal). Examples of such unrelated labels include "measurer," "measurement site," and "date and time of measurement."

The data acquiring unit 103 acquires a data set DS and its label information LI from the storage unit 102. The acquired data set DS and its label information LI are fed to the distance-matrix calculating unit 104.

The distance-matrix calculating unit 104 is a similarity-matrix generating unit that generates a distance matrix or similarity matrix from a data set DS. The similarity matrix has multiple columns horizontally arranged in the order in which multiple samples are arranged and multiple rows vertically arranged in the same order. The similarity matrix stores a similarity between a sample corresponding to each column and a sample corresponding to each row in a field specified by the column and the row. Note that each similarity included in the distance matrix is also referred to as an element of the distance matrix.

For example, the distance-matrix calculating unit 104 calculates an inter-sample distance for each combination of samples in the data set DS, and on the basis of the calculated inter-sample distances, generates a distance matrix, which is a matrix in which the number of rows and the number of columns are each equal to the number of samples.

The inter-sample distance is a measure of the similarity between two samples. The inter-sample distance is small if the two samples are similar, and is zero if the samples are exactly the same. Thus, the distance matrix is also referred to as a similarity matrix.

An example in which vibration data is collected for the purpose of abnormality diagnosis will now be describe.

Data measured at a certain time under a certain condition is treated as one sample. In the present example, a sample is one piece of time-series data indicating a one-dimensional value of a time point. It is presumed that each sample is provided with label information that is an "inspection result label" indicating the inspection result of the device, i.e., normal or abnormal, and a "measurement date label" indicating when the measurement was taken.

Here, it is presumed that two normal samples and two abnormal samples are measured on June 12, which is indicated by the measurement date label, and two normal samples and two abnormal samples are measured on June 13, which is indicated by the measurement date label.

A processing example will now be described for the case described above in which the distance-matrix calculating unit 104 actually calculates the inter-sample distances and creates a distance matrix. In this example, the similarity between the probability distributions of the two samples is defined as the similarity between the two samples.

In specific, the distance-matrix calculating unit 104 calculates the distribution formed by each sample. At this point, one distribution per sample is calculated. The distribution presumed here may be a normal distribution or the like.

The distance-matrix calculating unit 104 then calculates the inter-distribution distance of the two samples as a measure of the similarity between the samples. Examples methods of calculating the inter-distribution distance include the Bhattacharyya distance, Kullback-Leibler (KL) divergence, and Jensen-Shannon (JS) divergence.

Figure 2A:
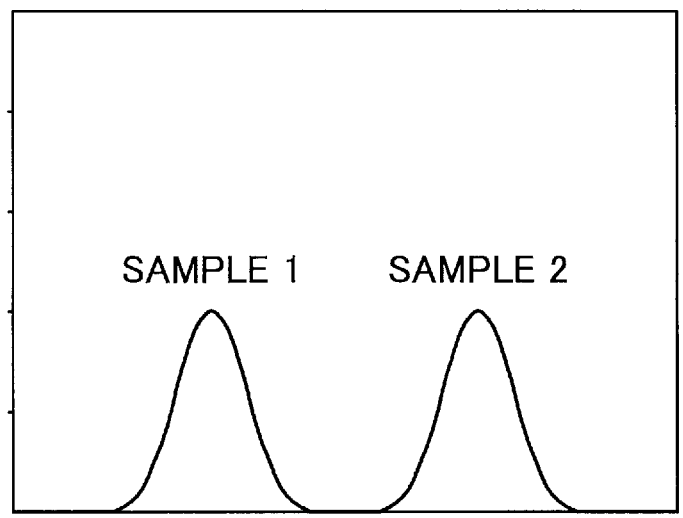
FIGS. 2A and 2B are graphs illustrating the distance between two sample distributions.
Figure 2B:
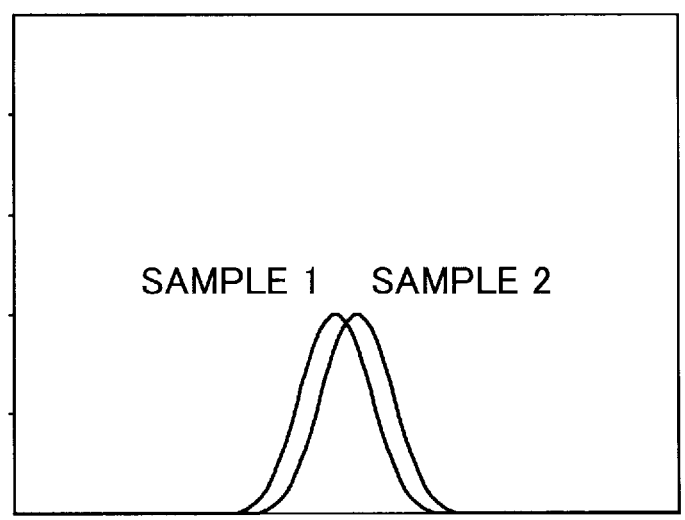

FIGS. 2A and 2B are graphs each illustrating the inter-distribution distance between two samples.

FIG. 2A illustrates a case in which the inter-distribution distance of the two samples is large, and FIG. 2B illustrates a case in which the inter-distribution distance of the two samples is small.

The distance-matrix calculating unit 104 then generates a distance matrix based on the inter-distribution distances calculated for all sample combinations. It is presumed that, in the distance matrix, the columns are arranged along the horizontal direction and the rows are arranged along the vertical direction in accordance with the order of eight samples.

FIG. 3 is a schematic diagram illustrating an example distance matrix.

As described above, eight samples are collected over two days. Here, each sample is given a sample number or sample identification information for specifying each sample. The distance between an N-th sample and an M-th sample is represented by an element at the N-th row and M-th column of the distance matrix. The characters N and M each denotes an integer within the range of 1 to 8.

The diagonal values of the distance matrix illustrated in FIG. 3 are all zero because they are the distances between same samples.

When a method with symmetry, such as the Bhattacharyya distance, is used to calculate the inter-sample distances, the distance matrix is a symmetric matrix because the distance values do not change even if the samples are swapped.

The order adjusting unit 105 generates an adjusted similarity matrix by referring to the label information LI and adjusting the order in which the samples are arranged in the similarity matrix so that the samples may be arranged in each of the classes of a target label designated among the labels.

In specific, the order adjusting unit 105 adjusts the order of the samples included the distance matrix generated by the distance-matrix calculating unit 104 according to the designated label. As described above, when an "inspection result label" and a "measurement date label" are included as the label information, the order adjusting unit 105 adjusts the order of the samples in the distance matrix by the "inspection result label" or the "measurement date label."

For example, when the distance matrix is to be sorted by the inspection result label, which includes two classes, a "normal class" and an "abnormal class," the order adjusting unit 105 adjusts the order of the samples so that the samples are arranged by class, that is, the samples belonging to the abnormal class (abnormal samples) are arranged behind the samples belonging to the normal class (normal samples). For example, as illustrated in FIG. 3, among the eight sample, if the samples having odd sample numbers are in the normal class and the samples having even sample numbers are in the abnormal class, the order adjusting unit 105 adjusts the order of the samples in the distance matrix illustrated in FIG. 3 to be that in the adjusted distance matrix illustrated in FIG. 4. Note that the adjusted distance matrix may also be referred to as adjusted similarity matrix.

Alternatively, when the distance matrix is to be sorted by the measurement date label, which includes two classes, a "June 12 class" and a "June 13 class," the order adjusting unit 105 adjusts the order of the samples so that the samples belonging to the June 13 class are arranged behind the samples belonging to the June 12 class. For example, as illustrated in FIG. 3, among the eight samples, if the samples having the sample numbers 1 to 4 belong to the June 12 class and the samples having the sample numbers 5 to 8 belong to the June 13 class, the order adjusting unit 105 provides the distance matrix illustrated in FIG. 3 as the adjusted distance matrix.

The visualizing unit 106 generates an evaluation screen image that visualizes the adjusted distance matrix, and causes the evaluation screen image to appear on the display unit 107 for presentation to a user.

For example, the visualizing unit 106 generates the evaluation screen image by determining the brightness of the color of the fields corresponding to the elements, in accordance with the values of the elements in the adjusted distance matrix in which the order has been adjusted by the order adjusting unit 105. By changing the brightness/darkness of the fields corresponding to the elements in the adjusted distance matrix in accordance with the values of the fields, it is possible to visually represent the quality problem of the data set caused by the label used for the order change.

In specific, the visualizing unit 106 compares the values of the fields of the adjusted distance matrix with a predetermined threshold, and when a value is smaller than the predetermined threshold, the color of the field is set darker than the color of the fields having values equal to or greater than the predetermined threshold.

Before describing the effect achieved by the evaluation screen image, a "good data set" will now be described.

Here, the data set is presumed to be a data set for abnormality diagnosis. Thus, it is preferable that the abnormal samples and the normal samples have properties as different as possible. For the measurement date label, which is a label expected to be unrelated to the diagnosis of abnormality and normality, it is expected that the characteristics of the samples do not change even if their classes differ. Based on the above, a "good data set" in this example is defined as a data set satisfying the following two conditions.

The first condition is that the distance between samples of different classes of the inspection result label is large. In other words, the similarity between samples of different classes of the inspection result label is low.

The second condition is that the distances between different samples in the measurement date label are dispersed. In other words, the similarity between samples may be low or high regardless of the class of the measurement date label being the same or different.

By visualizing the adjusted distance matrix, which is obtained by adjusting the distance matrix by the order of classes in a designated label, it is possible to visually check whether the data set satisfies the above two conditions.

Figures 5A, 5B:
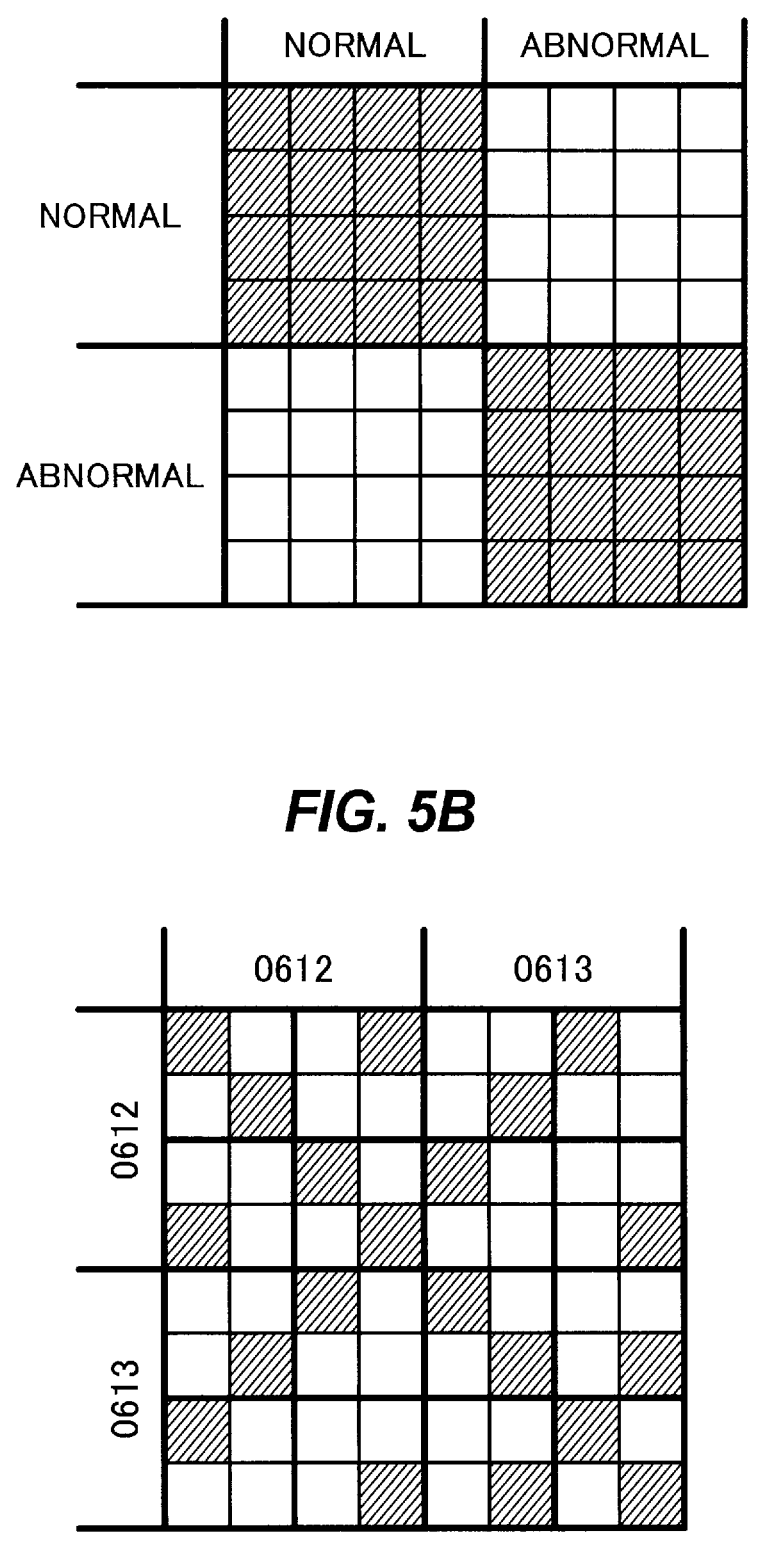

For example, the order of samples can be adjusted by dividing the samples into a normal class and an abnormal class of the inspection result label. As illustrated in FIG. 5A, if the distances between the samples in the normal class and the distances between the samples in the abnormal class are both smaller than a predetermined threshold, and thus the color of the corresponding fields are dark, and if the distances between the samples in the normal class and the samples in the abnormal class are equal to or greater than the predetermined threshold, and thus the color of the corresponding fields are bright, it can be confirmed that the first condition is satisfied.

In contrast, the order of the samples can be adjusted by dividing the samples into a June 12 class and a June 13 class of the measurement date label. As illustrated in FIG. 5B, if the bright fields and the dark fields are dispersed for both samples in same classes and different classes, it can be confirmed that the second condition is satisfied.

On the other hand, for example, the order of the samples can be adjusted by dividing the samples into a normal class and an abnormal class of the inspection result label. As illustrated in FIG. 6A, if the bright fields and the dark fields are dispersed for both samples in same classes and different classes, it can be confirmed that the first condition is not satisfied.

The order of samples can be adjusted by dividing the sample into a June 12 class and a June 13 class of the measurement date label. As illustrated in FIG. 6B, if the distances between the samples in the June 12 class and the distances between the samples in the June 13 class are smaller than a predetermined threshold, and thus the color of the corresponding fields is dark, and if the distances between the samples in the June 12 class and the samples in the June 13 class are equal to or greater than the predetermined threshold, and thus the color of the corresponding fields is bright, it can be confirmed that the second condition is not satisfied.

In such a case, the cause of the deterioration of the inspection result can be specified to be the variation in the data in the measurement date.

Although an example in which the order of samples is adjusted by the respective classes included in a label has been described above, the adjustment is not limited to such an example.

For example, as illustrated in FIG. 6A, after the order of the samples have been adjusted by dividing the samples into a normal class and an abnormal class of the inspection result label, the order of the samples in the normal class and the order of the samples in the abnormal class may be adjusted by further dividing each class into a June 12 class and a June 13 class of the measurement date label.

In such a case, the samples in the normal class and the samples in the abnormal class are each further classified into a June 12 class and a June 13 class, as illustrated in FIG. 7, for example.

At this time, if the bright and dark matrix elements in the normal class and the abnormal class are arranged close together by measurement dates (by measurement date label), as illustrated in FIG. 7, the cause of the deterioration of the inspection result can be specified to be the variation in the data in the measurement date.

An interpretation method of a visualized evaluation screen image will now be explained.

Here, four examples of adjusted distance matrices visualized as evaluation screen images are illustrated in FIGS. 8 to 12 in which the order of nine samples in a data set is adjusted by three classes of a label.

In FIGS. 8 to 12, the three classes are respectively numbered 1 to 3, and it is assumed that the adjusted distance matrix is generated by arranging the samples in the distance matrix in ascending order.

As illustrated in FIG. 8, if only the diagonal sections in the adjusted distance matrix 120 have low brightness, and the other sections have high brightness, it can be determined that the variation caused by the corresponding label has occurred in the data because the samples in the same class are similar to each other but not similar to the samples in other classes. For example, if there are two classes, the result will be as in FIG. 6B.

Figure 9:
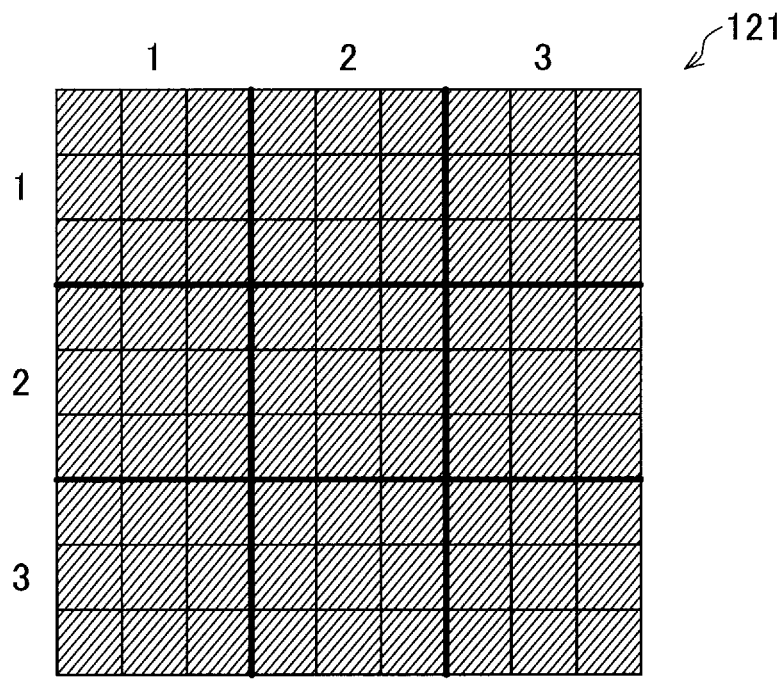
FIG. 9 is a schematic diagram illustrating a second example of an evaluation screen image that visualizes an adjusted distance matrix.

As in the adjusted distance matrix 121 illustrated in FIG. 9, if the brightness does not change among the different classes and all the fields are dark-colored, it can be determined that all pieces of data are similar, and thus no data variation caused by the label has occurred.

Figure 10:
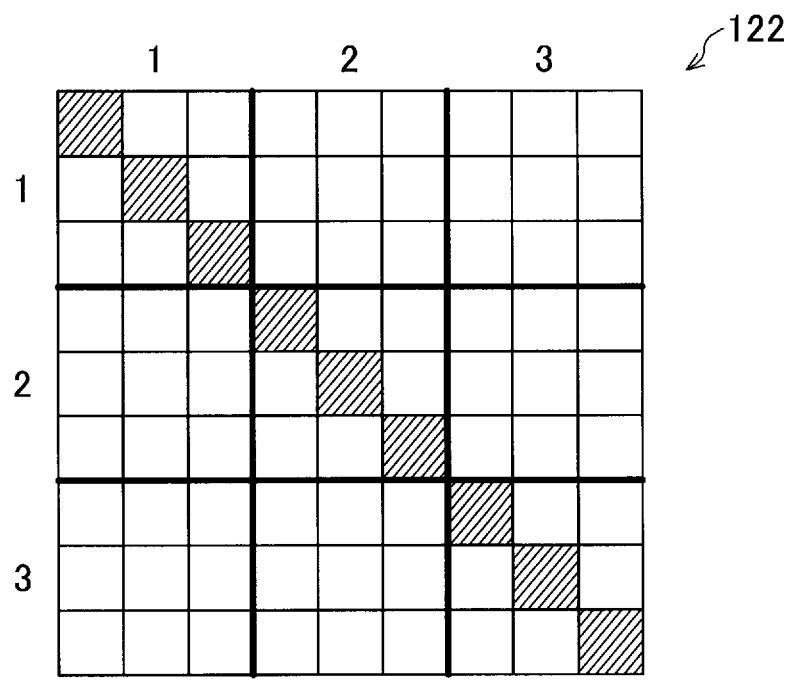
FIG. 10 is a schematic diagram illustrating a third example of an evaluation screen image that visualizes an adjusted distance matrix.

As in the adjusted distance matrix 122 illustrated in FIG. 10, if all fields other than the diagonal fields corresponding to same samples are bright-colored, it can be determined that all pieces of data vary regardless of class. In such a case, there is no data variation caused by the label, but there is a high possibility that there is a problem in the data quality because the data set is completely dispersed.

Figure 11:
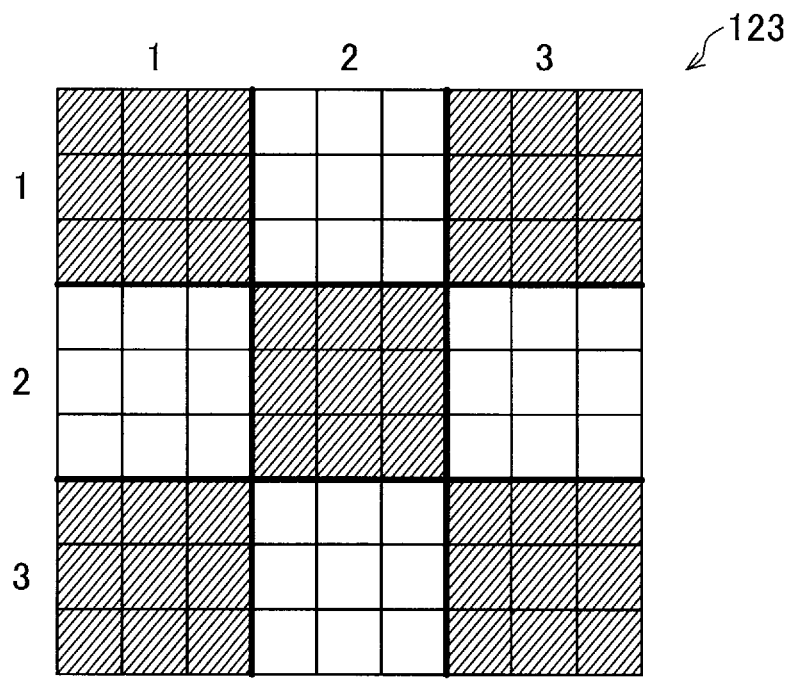
FIG. 11 is a schematic diagram illustrating a fourth example of an evaluation screen image that visualizes an adjusted distance matrix.

As in the adjusted distance matrix 123 illustrated in FIG. 11, if the brightness of the diagonal sections (see FIG. 8) and brightness of the fields indicating the values between the samples in class 1 and the samples in class 3 is low, it can be determined that only the class 2 data has properties different from those of the data in the other classes.

For example, if the classes represent data measurers, it is possible to visually confirm that the data of the measurer corresponding to class 2 (measurer 2) is different from the data of other measurers (measurers 1 and 3). As a result, it is possible to examine the deterioration factor of data quality, such as the possibility of a failure in the measuring method adopted by measurer 2.

Figure 12:
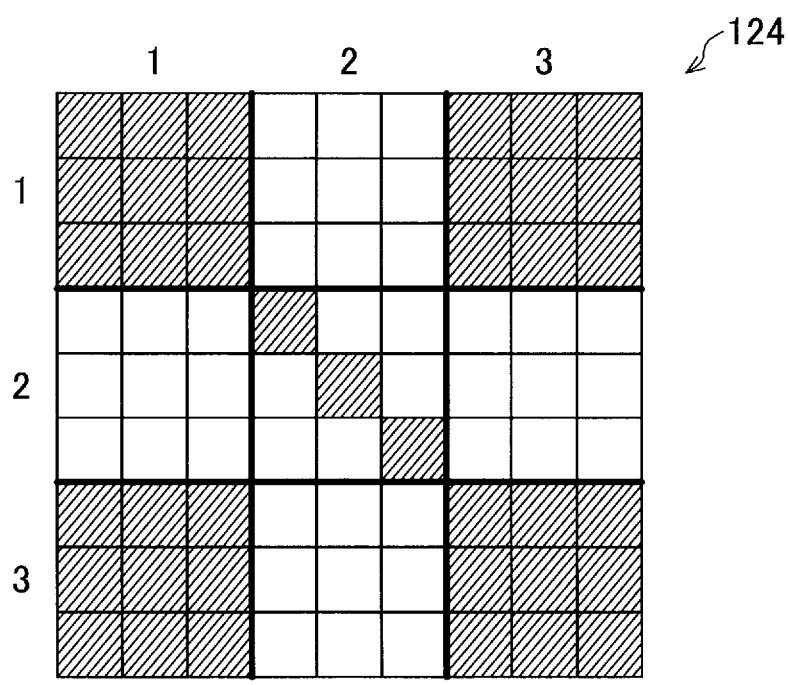
FIG. 12 is a schematic diagram illustrating a fifth example of an evaluation screen image that visualizes an adjusted distance matrix.

As in the adjusted distance matrix 124 illustrated in FIG. 12, if the samples belonging to classes 1 and class 3 are similar, the samples belonging to class 2 are not similar to the samples belonging to classes 1 and 3, and different samples belonging to class 2 are not similar to each other, it can be determined that only the data of class 2 is different from the data of classes 1 and 3, and the data of class 2 is variable.

For visualization, information indicating the classes may be displayed along the left and top sides of the adjusted distance matrix, as illustrated in FIGS. 5 to 7, so that the order of the classes of label used for sorting is noticeable.

Figure 13:
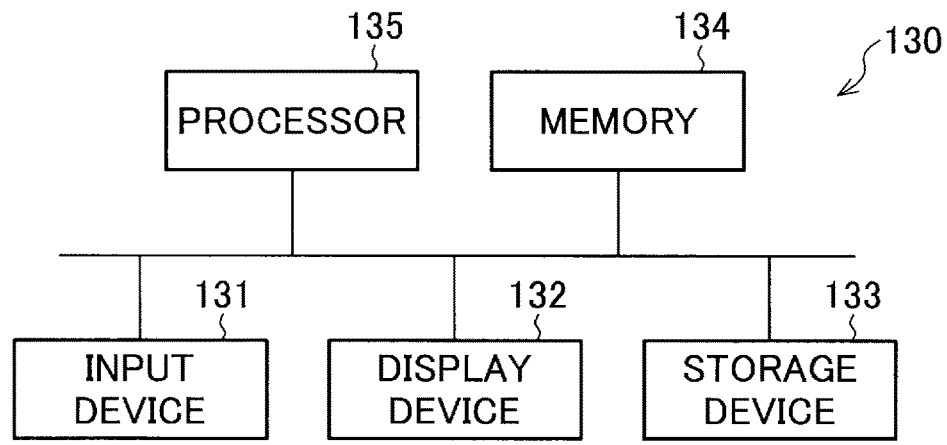
FIG. 13 is a block diagram example illustrating a hardware configuration example of a data visualizing apparatus.

FIG. 13 is a block diagram illustrating a hardware configuration example of the data visualizing apparatus 100.

The data visualizing apparatus 100 can be implemented by a computer 130 including an input device 131, a display device 132, a storage device 133, a memory 134, and a processor 135.

The input device 131 is a device to which a user inputs an instruction, such as a mouse, a touch screen, a keyboard, a gesture operation input device of a head mounted display (HMD), or an eye tracking input device.

The display device 132 is a device for displaying an application, such as a display for presenting a visualized image to a user. The display device 132 also includes, for example, a see-through HMD.

The storage device 133 is a storage device and includes a hard disk drive (HDD) or a solid-state drive (SSD).

The memory 134 is a temporary storage device and includes a random-access memory (RAM).

The processor 135 is a processing circuit, such as a central processing unit (CPU).

For example, the input unit 101 can be implemented by the processor 135 using the input device 131.

The display unit 107 can be implemented by the processor 135 using the display device 132.

The storage unit 102 can be implemented by the processor 135 using the memory 134.

The data acquiring unit 103, the distance-matrix calculating unit 104, the order adjusting unit 105, and the visualizing unit 106 can be implemented by the processor 135 reading programs stored in the storage device 133 into the memory 134 and executing the programs.

Such programs may be provided via a network or may be recorded and provided on a recording medium or a non-transitory computer-readable storage medium. That is, such programs may be provided as, for example, program products.

Figure 14:
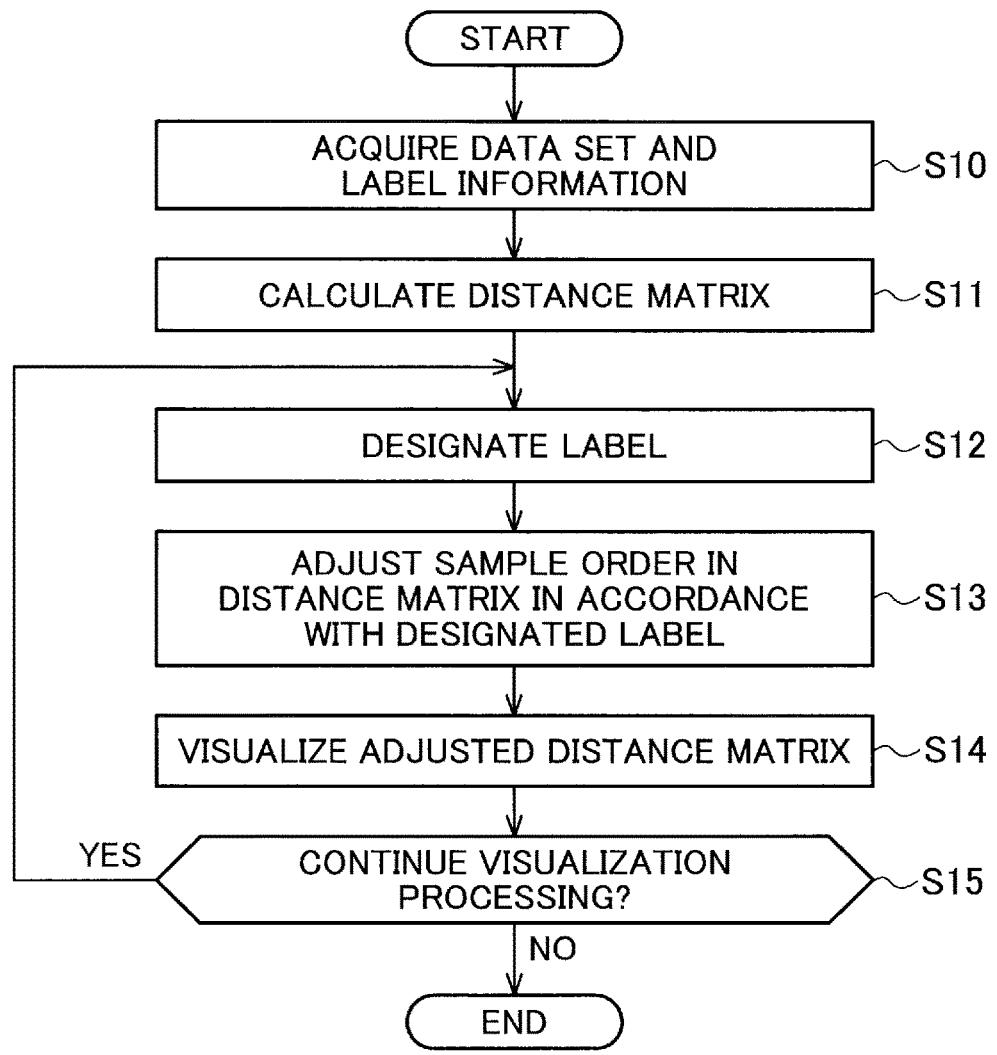
FIG. 14 is a flowchart illustrating processing by a data visualizing apparatus according to the first embodiment.

FIG. 14 is a flowchart illustrating processing by the data visualizing apparatus 100 according to the first embodiment.

The data acquiring unit 103 acquires a data set DS and its label information LI from the storage unit 102 (step S10). The acquired data set DS and its label information LI are fed to the distance-matrix calculating unit 104.

The distance-matrix calculating unit 104 generates a distance matrix composed of the similarities between respective samples of the data set DS (step S11). For example, the distance-matrix calculating unit 104 calculates the inter-sample distance for each combination of samples in the data set DS, and on the basis of the calculated inter-sample distances, generates a distance matrix, which is a matrix in which the number of rows and the number of columns are each equal to the number of samples.

The input unit 101 then accepts a label designation from a user to adjust the order of the samples in the distance matrix (step S12). The user information UI indicating the designated label is fed to the order adjusting unit 105. Here, the designated label is also referred to as a target label.

The order adjusting unit 105 adjusts the distance matrix generated by the distance-matrix calculating unit 104 so that the samples are arranged by class of the designated label, to generate an adjusted distance matrix (step S13).

The visualizing unit 106 generates an evaluation screen image that visualizes the adjusted distance matrix, and causes the evaluation screen image to appear on the display unit 107 (step S14). For example, in accordance with the values included in the adjusted distance matrix of which the order has been adjusted by the order adjusting unit 105, the visualizing unit 106 generates an evaluation screen image by determining the brightness of the color of fields containing these values.

The order adjusting unit 105 then determines whether or not to continue the visualization processing (step S15). For example, when user information UI indicating a label is sent from the input unit 101, the order adjusting unit 105 determines to continue the visualization processing. When user information UI indicating an instruction for ending the processing is sent from the input unit 101, the order adjusting unit 105 determines not to continue the visualization processing. If the visualization processing is continued (Yes in step S14), the processing returns to step S12, and when the visualization processing is not continued (No in step S14), the processing ends.

As described above, according to the first embodiment, by adjusting the order of the samples in a distance matrix with any label and visualizing the adjusted distance matrix, it is possible to intuitively express the variation in a data set caused by a designated label. This can reveal a problem in data set quality caused by the labels used in the adjustment.

Second Embodiment

In the first embodiment, the result of the adjustment of the order of samples in a distance matrix by a designated label is visualized, and a user interprets the variation in the data.

In the second embodiment, the degree of data variation is calculated in advance to support the designation of a label for adjusting the order. Alternatively, the calculated degree of variation is used for automatically designating the label for adjusting the order.

Figures 15, 16:
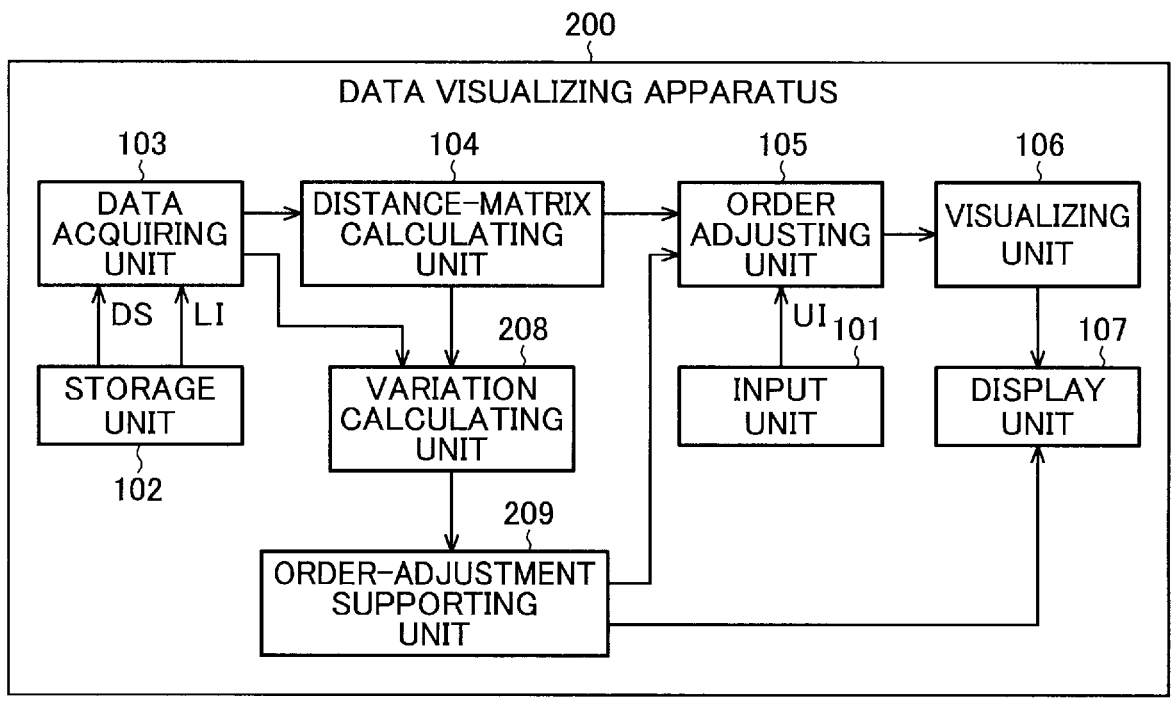
FIG. 15 is a block diagram schematically illustrating the configuration of a data visualizing apparatus according to a second embodiment.
FIG. 16 is a schematic diagram illustrating an example of submatrices.

FIG. 15 is a block diagram schematically illustrating the configuration of a data visualizing apparatus 200 according to the second embodiment.

The data visualizing apparatus 200 includes an input unit 101, a storage unit 102, a data acquiring unit 103, a distance-matrix calculating unit 104, an order adjusting unit 105, a visualizing unit 106, a display unit 107, a variation calculating unit 208, and an order-adjustment supporting unit 209.

The input unit 101, the storage unit 102, the data acquiring unit 103, the distance-matrix calculating unit 104, the order adjusting unit 105, the visualizing unit 106, and the display unit 107 of the data visualizing apparatus 200 according to the second embodiment are respectively the same as the input unit 101, the storage unit 102, the data acquiring unit 103, the distance-matrix calculating unit 104, the order adjusting unit 105, the visualizing unit 106, and the display unit 107 of the data visualizing apparatus 100 according to the first embodiment.

However, the data acquiring unit 103 feeds the acquired data set DS and its label information LI also to the variation calculating unit 208, and the distance-matrix calculating unit 104 feeds the generated distance matrix also to the variation calculating unit 208.

The variation calculating unit 208 calculates a degree of variation of multiple samples or data, which is caused by each label.

In the first embodiment, the quality problem is revealed by the user interpretating the visualized adjusted distance matrix. For example, as in the adjusted distance matrix 120 illustrated in FIG. 8, if the brightness of the diagonal sections where the same classes intersect is low and the brightness of the other sections is high, it can be determined that variation is caused by a label.

The role of the variation calculating unit 208 is to quantify the features as numerical values instead of the user interpreting the features of such a distance matrix. The variation calculating unit 208 can quantify the "degree of data variation caused by a specific label." Specific processing by the variation calculating unit 208 will now be explained.

An example in which data variation caused by a certain label is calculated for a data set having N samples (where N is an integer of 2 or larger) will now be explained.

The number of classes included in the label to be calculated is C (where C is an integer of 2 or larger), and each class is represented as class 1, class 2 . . . , class C.

An adjusted distance matrix M is obtained by adjusting the samples in a distance matrix calculated from the data set so as to be in the order of 1, 2 . . . , and C. In this example, it is presumed that the distance matrix is composed of the Bhattacharyya distance between the samples.

The number of elements in M is N×N. Here, since samples of the distance matrix are adjusted by a label having C classes, there are C×C regions or submatrices in the adjusted distance matrix M. These submatrices are denoted by $D_{11}$, $D_{12}$ . . . , $D_{CC}$ as illustrated in FIG. 16.

A submatrix $D_{ij}$ is composed of samples belonging to class i (where i is an integer satisfying $1 \leq i \leq C$) and samples belonging to class j (where j is an integer satisfying $1 \leq j \leq C$).

The submatrix $D_{ij}$ is a $N_i \times N_j$ matrix where $N_i$ is the number of samples belonging to class i, and $N_j$ is the number of samples belonging to class j. Each element of $D_{ij}$ is denoted by $d_{kl}^{(ij)}$.

Here, the average value $\mu_{ij}$ of the elements of the submatrix is calculated to be a representative value of each section corresponding to each submatrix $D_{ij}$.

Figure 17:
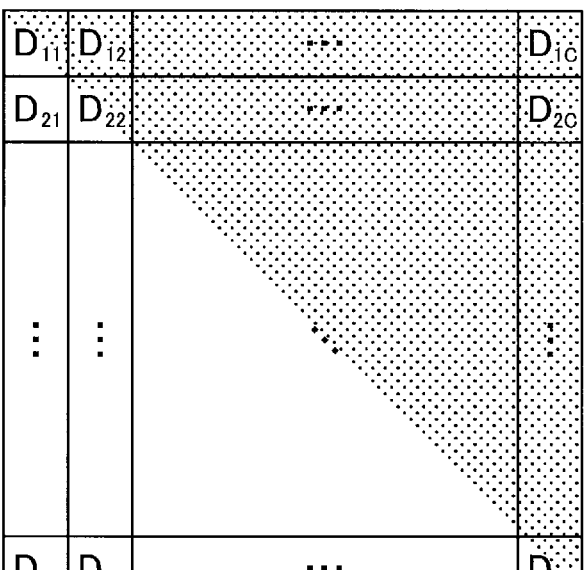
FIG. 17 is a schematic diagram for explaining a calculation method.

The symmetry of the adjusted distance matrix M allows calculation of $\mu_{ij}$ by using the hatched section in FIG. 17. When i=j, $D_{ij}$ is a symmetric matrix, and thus the average value is calculated using only the elements on the top right of the diagonal line. Since $\mu_{ij} = \mu_{ji}$, there is no need to perform calculation for the section where i>j.

The following equations (1) are equations for calculating $\mu_{ij}$.

$$\text{if } i = j, \qquad\qquad\qquad\qquad\qquad\qquad (1)$$

$$\mu_{ij} = \mu_{ii} = \frac{2}{N_i(N_i-1)} \sum_{k=1}^{N_i-1} \sum_{l=k+1}^{N_i} d_{kl}^{(ij)}$$

$$\text{if } i \neq j,$$

$$\mu_{ij} = \frac{1}{N_i N_j} \sum_{k=1}^{N_i} \sum_{l=1}^{N_j} d_{kl}^{(ij)}$$

The average value $\mu_{ij}$ is used as a representative value of the submatrix $D_{ij}$, but the second embodiment is not limited to such an example. For example, the median value of the elements included in the submatrix $D_{ij}$ may be used as a representative value of the submatrix $D_{ij}$.

As a qualitative meaning of the average value $\mu_{ij}$, when $i \neq j$, $\mu_{ij}$ can be considered to be representing the similarity between data belonging to class i and data belonging to class j. For example, if $\mu_{12}$ is a small value, it is presumed that the data of class 1 is similar to the data of class 2, and that the data variation caused by the difference in the classes has not occurred. When i=j, the average value $\mu_{ij}$ represents the degree of variation between data items belonging to the same class.

In a state where data variation caused by a label occurs, as illustrated in FIG. 6B or FIG. 8, the values of the elements of the adjusted distance matrix included in $D_{ii}$ located on the diagonal line of the distance matrix are small, and the values of the other elements are large. Thus, the degree of data variation V caused by a certain label can be formulated as, for example, Equation (2) below.

$$V = \frac{2}{C(C-1)} \sum_{i=1}^{c-1} \sum_{j=i+1}^{c} \mu_{ij} - \frac{1}{C} \sum_{i=1}^{c} \mu_{ii} \qquad (2)$$

The left term of Equation (2) calculates all combinations of $\mu_{ij}$ when i≠j and the average thereof. This indicates how much the data varies between different classes.

The right term of Equation (2) calculates all combinations of $\mu_{ij}$ when i=j and the average thereof. This indicates how much the data disperses in same classes.

As illustrated in FIG. 6B or FIG. 8, when data variation caused by a label occurs, the value V increases. It is desirable for V to be a large value for the label to be identified in the data set (here, the inspection result label) and a small value for a label that is expected to be unrelated to the label to be identified (here, the measurement date label).

As described above, in multiple classes, the variation calculating unit 208 calculates, for each label given in advance, the degree of variation V calculated by subtracting the average of the representative values of the similarities between samples classified into the same class from the average of the representative values of the similarities between samples classified into different classes. For example, if the data set is given five labels, five Vs corresponding to the respective labels are obtained through this processing.

The order-adjustment supporting unit 209 causes the display unit 107 to display a variation result screen image as a result obtained by the variation calculating unit 208 and presents the result to a user, to support the user in designating the label to be used for adjustment. The variation result screen image is, for example, a screen image for displaying labels in descending order of the degree of variation V. The user may designate a target label by referring to such a screen.

The order-adjustment supporting unit 209 may generate an adjusted distance matrix by notifying the order adjusting unit 105 of the result obtained by the variation calculating unit 208 and automatically adjusting the order of the samples included in the distance matrix, instead of displaying the variation result screen image. For example, the order-adjustment supporting unit 209 may designate the label having the highest degree of variation as the target label and cause the order adjusting unit 105 to generate an adjusted distance matrix in accordance with the target label. Alternatively, the order-adjustment supporting unit 209 may designate multiple labels as target labels in descending order of the degree of variation. Alternatively, the order-adjustment supporting unit 209 may designate the label having the highest degree of variation and the label having the lowest degree of variation as the target labels.

The data visualizing apparatus 200 according to the second embodiment can also be implemented by the computer 130 illustrated in FIG. 13.

For example, the variation calculating unit 208 and the order-adjustment supporting unit 209 can be implemented by the processor 135 loading programs stored in the storage device 133 to the memory 134 and executing the programs.

Figure 18:
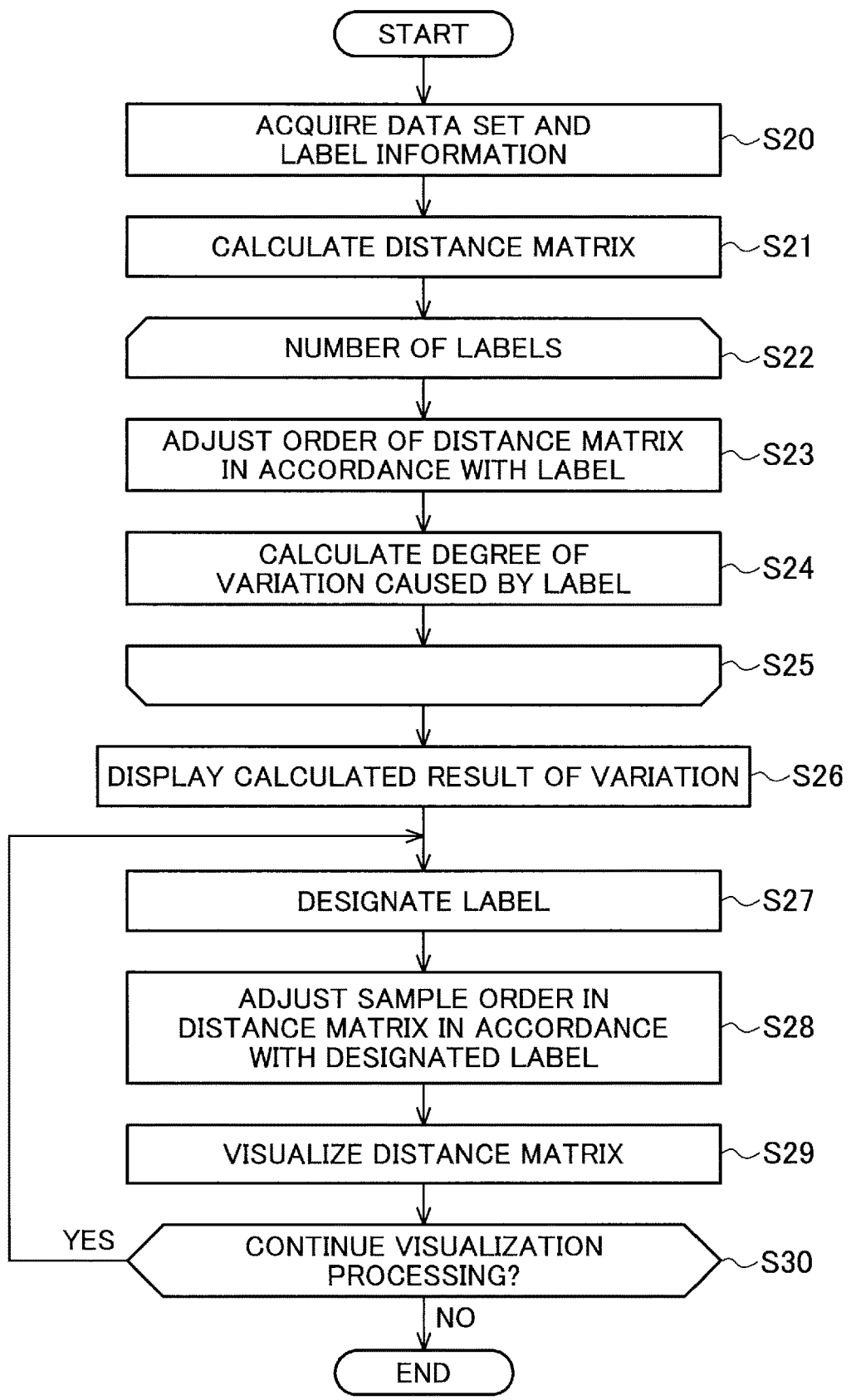
FIG. 18 is a flowchart illustrating first processing by the data visualizing apparatus according to the second embodiment.

FIG. 18 is a flowchart illustrating first processing by the data visualizing apparatus 200 according to the second embodiment.

The first processing is processing in which the order-adjustment supporting unit 209 causes the display unit 107 to display a variation result screen image as the result obtained by the variation calculating unit 208.

The data acquiring unit 103 acquires a data set DS and its label information LI from the storage unit 102 (step S20). The acquired data set DS and its label information LI are fed to the distance-matrix calculating unit 104 and the distance-matrix calculating unit 208.

The distance-matrix calculating unit 104 calculates a distance matrix composed of the similarities between respective samples of the data set DS (step S21). The generated distance matrix is fed to the order adjusting unit 105 and the variation calculating unit 208.

The variation calculating unit 208 then repeats the processing of steps S23 and S24 by a number of times equal to the number of labels indicated by the label information LI (steps S22 and S25).

In step S23, the variation calculating unit 208 specifies a label for which the degree of variation V has not yet been calculated from the labels indicated by the label information LI, and adjusts the order of samples included in the distance matrix in accordance with the specified label.

In step S24, the variation calculating unit 208 calculates the degree of data variation V caused by the specified label on the basis of the adjusted distance matrix.

The order-adjustment supporting unit 209 then causes the display unit 107 to display a variation result screen image indicating the degree of variation V calculated by the variation calculating unit 208 (step S26).

The input unit 101 then accepts a label designation from a user to adjust the order of the samples included in the distance matrix (step S27). The user information UI indicating the designated label is fed to the order adjusting unit 105. The user may refer to the variation result screen image displayed on the display unit 107 and designate a label.

The order adjusting unit 105 adjusts the distance matrix generated by the distance-matrix calculating unit 104 so that the samples are arranged by the respective classes in the designated label, to generate an adjusted distance matrix (step S28).

The visualizing unit 106 generates an evaluation screen image that visualizes the adjusted distance matrix, and causes the evaluation screen image to appear on the display unit 107 (step S29).

The order adjusting unit 105 then determines whether or not to continue the visualization processing (step S30). For example, when user information UI indicating a label is sent from the input unit 101, the order adjusting unit 105 determines to continue the visualization processing. When user information UI indicating an instruction for ending the processing is sent from the input unit 101, the order adjusting unit 105 determines not to continue the visualization processing. If the visualization processing is continued (Yes in step S30), the processing returns to step S27, and when the visualization processing is not continued (No in step S30), the processing ends.

Figure 19:
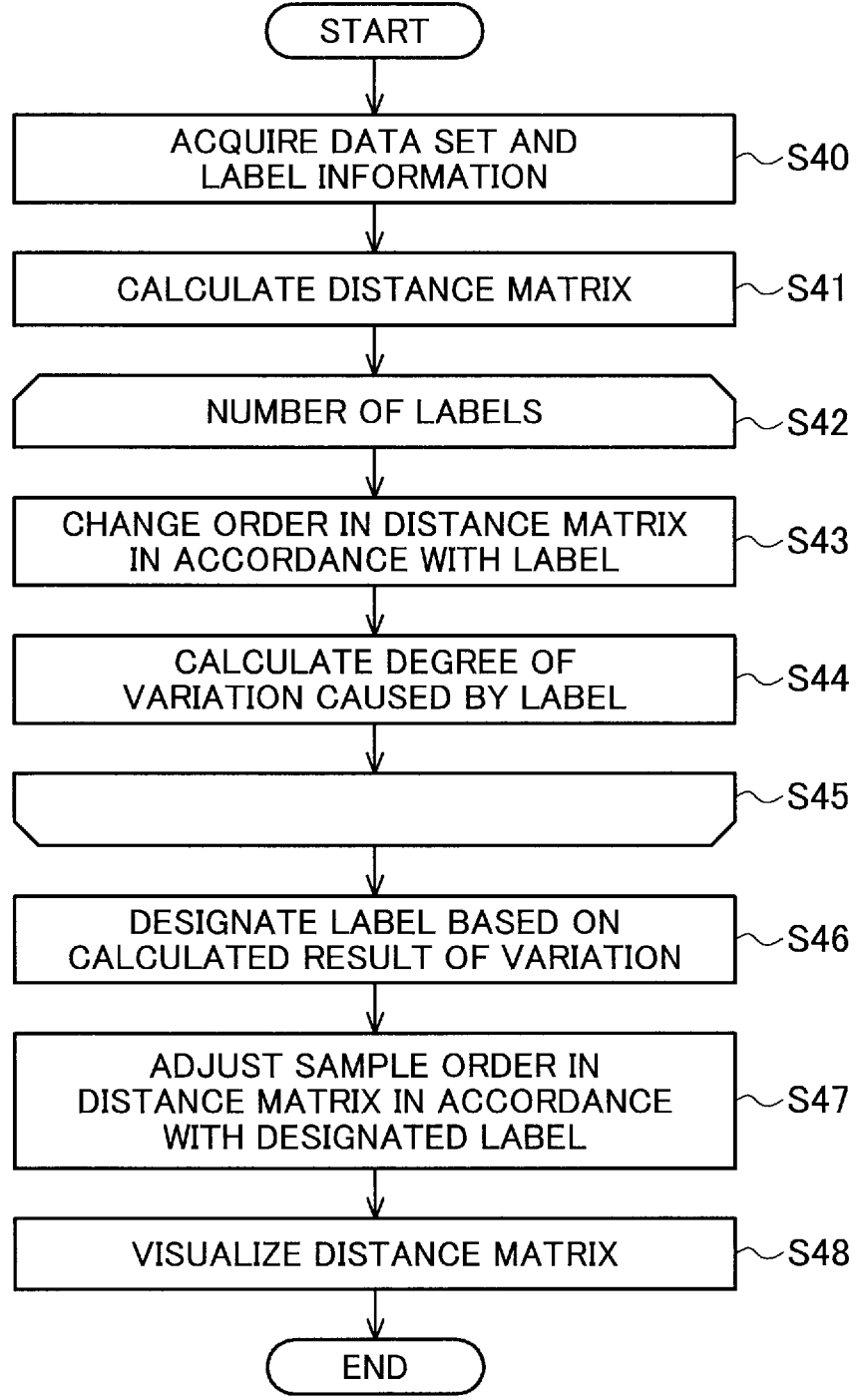
FIG. 19 is a flowchart illustrating second processing by the data visualizing apparatus according to the second embodiment.

FIG. 19 is a flowchart illustrating second processing by the data visualizing apparatus 200 according to the second embodiment.

The second processing is processing in which the order-adjustment supporting unit 209 designates a label on the basis of the variation result obtained by the variation calculating unit 208.

The data acquiring unit 103 acquires a data set DS and its label information LI from the storage unit 102 (step S40). The acquired data set DS and its label information LI are fed to the distance-matrix calculating unit 104 and the distance-matrix calculating unit 208.

The distance-matrix calculating unit 104 calculates a distance matrix composed of the similarities between respective samples of the data set DS (step S41). The generated distance matrix is fed to the order adjusting unit 105 and the variation calculating unit 208.

The variation calculating unit 208 then repeats the processing of steps S43 and S44 by a number of times equal to the number of labels indicated by the label information LI (steps S42 and S45).

In step S43, the variation calculating unit 208 specifies a label for which the degree of variation V has not yet been calculated from the labels indicated by the label information LI, and adjusts the order of samples included in the distance matrix in accordance with the specified label.

In step S44, the variation calculating unit 208 calculates the degree of data variation V caused by the specified label on the basis of the adjusted distance matrix.

The order-adjustment supporting unit 209 then designates a label in accordance with the degree of variation V calculated by the variation calculating unit 208 (step S46). For example, the order-adjustment supporting unit 209 may designate the label having the largest degree of variation V.

The order adjusting unit 105 then adjusts the distance matrix generated by the distance-matrix calculating unit 104 so that the samples are arranged by the respective classes in the designated label, to generate an adjusted distance matrix (step S47).

The visualizing unit 106 generates an evaluation screen image that visualizes the adjusted distance matrix, and causes the evaluation screen image to appear on the display unit 107 (step S48).

As described above, according to the second embodiment, it is possible to support or automate the adjustment of samples included in the distance matrix by preliminarily obtaining the data variation caused by each label by the variation calculating unit 208.

In step S46 of the flowchart illustrated in FIG. 19, the order-adjustment supporting unit 209 may designate multiple labels, so that multiple evaluation screen images appear on the display unit 107 through steps S47 and S48. In such a case, the order-adjustment supporting unit 209 may designate multiple labels in descending order of the degree of variation V.

In the second embodiment, automation of label designation and label designation by the user may be combined. For example, an evaluation screen image for an automatically designated label is displayed as illustrated in FIG. 19, and then, for example, a variation result screen image is displayed in response to an instruction from the user, and the user may designate a label.

Third Embodiment

Figure 20:
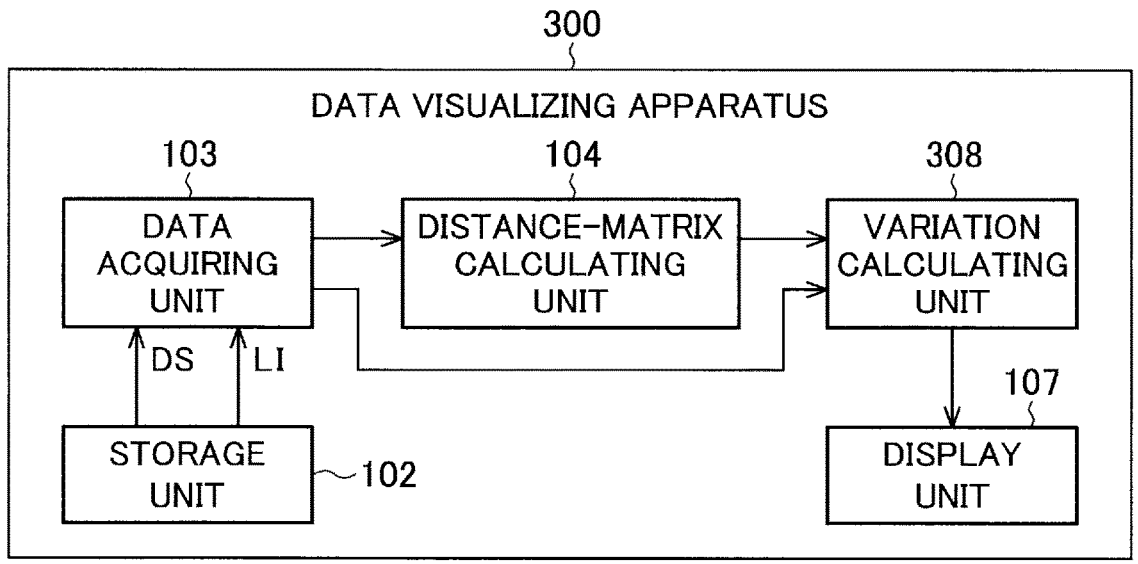
FIG. 20 is a block diagram schematically illustrating the configuration of a data visualizing apparatus according to a third embodiment.

FIG. 20 is a block diagram schematically illustrating the configuration of a data visualizing apparatus 300 according to a third embodiment.

The data visualizing apparatus 300 includes a storage unit 102, a data acquiring unit 103, a distance-matrix calculating unit 104, a display unit 107, and a variation calculating unit 308.

The storage unit 102, the data acquiring unit 103, the distance-matrix calculating unit 104, and the display unit 107 of the data visualizing apparatus 300 according to the third embodiment are respectively the same as the storage unit 102, the data acquiring unit 103, the distance-matrix calculating unit 104, and the display unit 107 of the data visualizing apparatus 100 according to the first embodiment.

Note that the data visualizing apparatus 300 according to the third embodiment differs from the data visualizing apparatus 200 according to the second embodiment in that it does not include the input unit 101, the order adjusting unit 105, the visualizing unit 106, and the order-adjustment supporting unit 209.

Similar to the variation calculating unit 208 according to the second embodiment, the variation calculating unit 308 calculates the degree of data variation caused by every label indicated by the label information LI.

The variation calculating unit 308 then causes the display unit 107 to display a variation result screen image indicating the calculated degree of variation.

The variation result screen image may be, for example, a screen image for displaying a predetermined number of labels in descending order of the degree of variation V, or a screen image for displaying the degree of variation V of all labels. In other words, the variation calculating unit 308 may cause at least one label included in all labels indicated by the label information LI and a degree of variation corresponding to the at least one label to appear on the variation result screen image.

Figure 21:
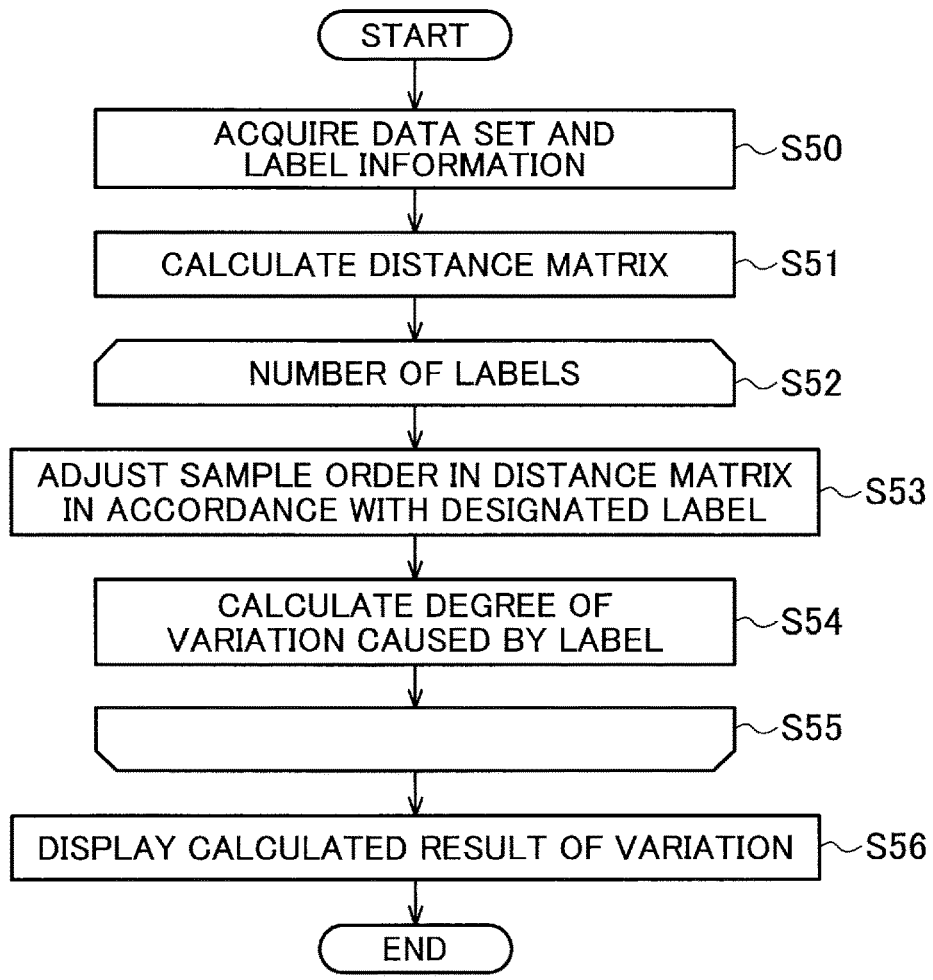
FIG. 21 is a flowchart illustrating processing by the data visualizing apparatus according to the third embodiment.

FIG. 21 is a flowchart illustrating processing by the data visualizing apparatus 300 according to the third embodiment.

The data acquiring unit 103 acquires a data set DS and its label information LI from the storage unit 102 (step S50). The acquired data set DS and its label information LI are fed to the distance-matrix calculating unit 104 and the distance-matrix calculating unit 308.

The distance-matrix calculating unit 104 calculates a distance matrix composed of the similarities between respective samples of the data set DS (step S51). The generated distance matrix is fed to the order adjusting unit 105 and the variation calculating unit 308.

The variation calculating unit 308 then repeats the processing of steps S53 and S54 by a number of times equal to the number of labels indicated by the label information LI (steps S52 and S55).

In step S53, the variation calculating unit 308 specifies a label for which the degree of variation V has not yet been calculated from the labels indicated by the label information LI, and adjusts the order of samples included in the distance matrix in accordance with the specified label.

In step S54, the variation calculating unit 308 calculates the degree of data variation V caused by the specified label on the basis of the adjusted distance matrix.

The variation calculating unit 308 then causes the display unit 107 to display a variation result screen image indicating the calculated degree of variation V (step S56).

According to the third embodiment, by presenting the degree of variation V of each label to the user, it is possible to reveal the label causing the quality problem of the data set.

An example of the data set handled by the above-described data visualizing apparatuses 100 to 300 according to the first to third embodiments, respectively, includes processing sound data collected for the purpose of automatically detecting a processing failure in cutting by a laser processing machine. This data can be collected by attaching an acoustic sensor or microphone to the processing head of the processing machine. Since the purpose is to detect a processing failure, an "inspection result label" indicating the presence or absence of a failure is attached to each piece of data. It is expected that the presence or absence of a processing failure finally be detected from the features of the processing sound data through machine learning.

The data visualizing apparatuses 100 to 300 are used to visualize and quantify the data quality as a preliminary step of data learning. When the data visualizing apparatuses 100 to 300 confirms the quality degradation and the deterioration factor, the data quality can be improved by taking measures such as "culling data for learning (i.e., not using data that is causing quality degradation)" or "improving the data collection method," depending on the result.

At the time of data collection, label information that is expected to be unrelated to the inspection result, such as the "measurement time point," the "measurer," the "device number," or the "measurement location," is also recorded, and the degree of data variation caused by each label is visualized and quantified by the processing described in the first to third embodiments.

In the first to third embodiments, time-series data indicating one-dimensional values for each time point is handled, but a sample need not necessarily be data indicating one-dimensional values for each time point. It is also possible to use time-series data indicating multidimensional values for each time point, or data converted into multidimensional data through feature extraction processing on a one-dimensional signal. The data may be any data besides time-series data.

Although the variation calculating units 208 and 308 described in the second and third embodiments, respectively, calculate the degree of variation for each "label." the variation calculating units 208 and 308 may calculate the "degree of variation caused by each class" included in a label of interest.

Assuming that the degree of data variation caused by class c (where c is an integer satisfying 1≤c≤C) is V(c), for example, V(c) can be formulated as Equation (3) below.

$$V(c) = V_{out}(c) - V_{in}(c) \quad (3)$$

$$V_{out}(c) = \frac{1}{C-1}\sum_{k=1}^{c}\mu_{ck} \cdot \delta_c(k)$$

$$\delta_c(k) = \begin{cases} 1 \ (k \neq c) \\ 0 \ (k = c) \end{cases}$$

$$V_{in}(c) = \mu_{cc}$$

As in Equation (3), V(c) is calculated by the difference between the inter-class variation $V_{out(c)}$ and the intra-class variation $V_{in(c)}$.

$V_{out(c)}$ represents how far the samples of class c diverge from the samples of other classes, and $V_{in(c)}$ represents how much the samples of class c vary from each other.

For example, when V(c) is determined for all classes 1 to 3 for the adjusted distance matrix 123 illustrated in FIG. 11, the value of V(2) is larger than the values of V(1) and V(3). In this way, it is possible to quantitatively indicate that only the samples of class 2 have properties different from those of other classes.

It is desirable for V(c) to be a large value for the classes included in the label to be identified in the data set (here, the inspection result label) and a small value for the classes included in a label that is expected to be unrelated to the label to be identified (here, the measurement date label).

When only the classes included in the label that is expected to be unrelated to the original identification target (for example, the measurer, the date of measurement, or the device number, etc.) are the targets of calculation, V(c) may be calculated by the following Equation (4).

$$V(c)=V_{out}(c)+V_{in}(c) \quad (4)$$

That is, when one class for which the degree of variation V(c) is to be calculated out of the multiple classes is the target class, the variation calculating units 208 and 308 may calculate the degree of variation V(c) by subtracting a representative value of the similarities between samples classified into the target class from the average of representative values of the similarities between samples classified into the target class and samples classified into classes other than the target class.

Alternatively, the variation calculating units 208 and 308 may calculate the degree of variation V(c) by adding the representative value of the similarities between the samples classified into the target class and the samples classified into classes other than the target class to the representative value of the similarities between the samples classified into the target class.

The order-adjustment supporting unit 209 or the variation calculating unit 308 may generate a variation result screen image for displaying multiple classes and the degree of variation V(c) corresponding to each of the classes, and cause the variation result screen image to appear on the display unit 107.

In such a case, the value increases in the class "that is different from the data of the other classes" and "that has a large variation among the data items in the same class," such as class 2 of the adjusted distance matrix 124 illustrated in FIG. 12, and this class can be considered to be a factor of quality degradation.

As described above, the variation calculating units 208 and 308 may calculate the degree of variation V caused by some label and the degree of variation V(c) caused by each class of the label for all the labels. Note that the degree of variation V is also referred to as a degree of label variation, and the degree of variation V(c) is also referred to as a degree of class variation.

V and V(c) may be calculated for the submatrices $D_{ii}$ after adjustment by a certain label. In such a case, the variation calculating units 208 and 308 sort the samples included in the submatrices $D_{ii}$ positioned diagonally in the adjusted distance matrix M adjusted by a certain label (for example, an inspection result label) by another certain label to obtain a readjusted distance matrix Mi, and then obtain the degrees of variation $V_i$ and $V_i(c)$ from the readjusted distance matrix $M_i$ through the same procedure. At this time, the final V and V(c) can be calculated, for example, by obtaining the average of $V_i$ and $V_i(c)$. This method can be used when a label having large variation is known in advance to calculate the degree of variation of the other labels. In this way, the degree of variation caused by other labels can be calculated without being affected by the label that has been adjusted first.

As described above, the variation calculating units 208 and 308 may calculate the "degree of data variation caused by each class included in a specific label."

For example, when a user designates a label via the input unit 101, the variation calculating unit 208 may calculate the degree of variation V(c) of each class included in the label. The variation calculating units 208 and 308 may calculate the degree of variation V for each label and the degree of variation V(c) for each class, and display the calculated results V and V(c) in the variation result screen image.

In first and second embodiments described above, an evaluation screen image is generated by comparing the value of the fields of an adjusted distance matrix with a predetermined threshold and making the color of a field darker than the color of the field of the value equal to or greater than the predetermined threshold when the value is smaller than the predetermined threshold. For example, the adjusted distance matrix may be visualized as a heat map, and the values of the fields of the adjusted distance matrix may be expressed in "color shades." For example, the adjusted distance matrix may be visualized as a heat map in which the smaller the value, the darker the color, and the larger the value, the lighter the color. It is also possible to combine the heat map representation with a threshold representation. For example, a representation method may be adopted in which all fields exceeding a predetermined upper limit are visualized with the "brightest color in the heat map (for example, white)," all fields below the predetermined lower limit are visualized with the "darkest color in the heat map (for example, black)," and the remaining fields are visualized in accordance with the heat map.

DESCRIPTION OF REFERENCE CHARACTERS 100, 200, 300 data visualizing apparatus; 101 input unit; 102 storage unit; 103 data acquiring unit; 104 distance-matrix calculating unit; 105 order adjusting unit; 106 visualizing unit; 107 display unit; 208, 308 variation calculating unit; 209 order-adjustment supporting unit.

What is claimed is:

1. An information processing apparatus comprising:
a processor to execute a program; and
a memory to store the program which, when executed by the processor, performs processes of,
generating a similarity matrix from a data set including a plurality of samples, the similarity matrix having a plurality of columns horizontally arranged in accordance with an order in which the plurality of samples is arranged and a plurality of rows vertically arranged in accordance with the order, the similarity matrix storing a similarity between a sample corresponding to one of the columns and a sample corresponding to one of the rows in a field specified by the one of the columns and the one of the rows;
generating an adjusted similarity matrix by referring to label information indicating a result of labeling each of the samples with a plurality of labels each having a plurality of classes and adjusting the order in the similarity matrix so that the samples are arranged by each of the classes of a target label designated in the plurality of labels;
generating an evaluation screen image indicating each field of the adjusted similarity matrix with a brightness corresponding to the similarity, wherein the brightness represents a quality problem of the data set; and
displaying the evaluation screen image.

2. The information processing apparatus according to claim 1, wherein the program further performs of a process of accepting a designation of the target label in the plurality of labels.

3. The information processing apparatus according to claim 1, wherein the program further performs of processes of
calculating a degree of variation of the samples caused by each of the labels;
generating a variation result screen image displaying the labels and the degree of variation corresponding to each of the labels;
displaying the variation result screen image; and
accepting a designation of the target label in the labels.

4. The information processing apparatus according to claim 3, wherein the degree of variation is calculated by subtracting an average of representative values of similarities between samples classified into a same class from an average of representative values of similarities between samples classified into different classes, out of the plurality of classes.

5. The information processing apparatus according to claim 1, wherein, the program further performs of a process of calculating a degree of variation of the samples caused by each of the labels and designate the label having the highest degree of variation as the target label.

6. The information processing apparatus according to claim 1, wherein, the program further performs of processes of calculating a degree of variation of the samples caused by each of the classes; generating a variation result screen image displaying the classes and the degree of variation corresponding to each of the classes; and displaying the variation result screen image.

7. The information processing apparatus according to claim 6, wherein, when one class of the plurality of classes for which the degree of variation is to be calculated is a target class, the degree of variation is calculated by subtracting a representative value of similarities between samples classified into the target class from an average of representative values of similarities between the samples classified into the target class and samples classified into classes other than the target class.

8. The information processing apparatus according to claim 6, wherein, when one class of the plurality of classes for which the degree of variation is to be calculated is a target class, the degree of variation is calculated by adding a representative value of similarities between samples classified into the target class to a representative value of similarities between the samples classified into the target class and samples classified into classes other than the target class.

9. The information processing apparatus according to claim 1, wherein the evaluation screen image indicates the plurality of classes of the target label in correlation with the plurality of columns and the plurality of rows of the adjusted similarity matrix.

10. A non-transitory computer-readable storage medium storing a program that causes a computer to execute processes comprising:
generating a similarity matrix from a data set including a plurality of samples, the similarity matrix having a plurality of columns horizontally arranged in accordance with an order in which the plurality of samples is arranged and a plurality of rows vertically arranged in accordance with the order, the similarity matrix storing a similarity between a sample corresponding to one of the columns and a sample corresponding to one of the rows in a field specified by the one of the columns and the one of the rows;
generating an adjusted similarity matrix by referring to label information indicating a result of labeling each of the samples with a plurality of labels each having a plurality of classes and adjusting the order in the similarity matrix so that the samples are arranged by each of the classes of a target label designated in the plurality of labels;

generating an evaluation screen image indicating each field of the adjusted similarity matrix in a brightness corresponding to the similarity, wherein the brightness represents a quality problem of the data set; and displaying the evaluation screen image.

11. An information processing method comprising:

generating a similarity matrix from a data set including a plurality of samples, the similarity matrix having a plurality of columns horizontally arranged in accordance with an order in which the plurality of samples is arranged and a plurality of rows vertically arranged in accordance with the order, the similarity matrix storing a similarity between a sample corresponding to one of the columns and a sample corresponding to one of the rows in a field specified by the one of the columns and the one of the rows;

generating an adjusted similarity matrix by referring to label information indicating a result of labeling each of the samples with a plurality of labels each having a plurality of classes and adjusting the order in the similarity matrix so that the samples are arranged by each of the classes of a target label designated in the plurality of labels;

generating an evaluation screen image indicating each field of the adjusted similarity matrix in a brightness corresponding to the similarity, wherein the brightness represents a quality problem of the data set; and displaying the evaluation screen image.

\* \* \* \* \*